(12) United States Patent
Brewer et al.

(10) Patent No.: US 12,039,201 B2
(45) Date of Patent: Jul. 16, 2024

(54) CONTROL PARAMETER ADDRESS VIRTUALIZATION

(71) Applicant: Micron Technology, Inc., Boise, ID (US)

(72) Inventors: Tony M. Brewer, Plano, TX (US); Michael Keith Dugan, Richardson, TX (US)

(73) Assignee: Micron Technology, Inc., Boise, ID (US)

( * ) Notice: Subject to any disclaimer, the term of this patent is extended or adjusted under 35 U.S.C. 154(b) by 136 days.

(21) Appl. No.: 17/898,803

(22) Filed: Aug. 30, 2022

(65) Prior Publication Data

US 2024/0069804 A1 Feb. 29, 2024

(51) Int. Cl.
*G06F 3/06* (2006.01)
(52) U.S. Cl.
CPC .......... *G06F 3/0659* (2013.01); *G06F 3/0622* (2013.01); *G06F 3/0679* (2013.01)
(58) Field of Classification Search
CPC ..... G06F 3/0622; G06F 3/0659; G06F 3/0679
USPC ........................................................ 711/154
See application file for complete search history.

(56) References Cited

U.S. PATENT DOCUMENTS

2016/0188492 A1* 6/2016 Bachwani ............... G06F 12/14 711/6
2023/0409245 A1* 12/2023 Park ...................... G06F 3/0688
2024/0028209 A1* 1/2024 Berke ................... G06F 3/0649

OTHER PUBLICATIONS

Sharma, D Das, "Compute Express Link", [Online]. Retrieved from the Internet: URL: https: www.computeexpresslink.org resource-library, (Mar. 1, 2019), 3 pages.
Sharma, Debendra Das, "Compute Express Link 2.0 White Pape", [Online]. Retrieved from the Internet: URL: https: www.computeexpresslink.org resource-library, (Nov. 1, 2020), 4 pages.
Sharma, Debendra Das, "CXL: Coherency, Memory, and I ??O Semantics on PCIe Infrastructure", [Online]. Retrieved from the Internet: URL: https: www.electronicdesign.com technologies embedded-revolution article 21162617 cxl-coherency-memory-and-io-semantics-on-pcie-infrastructure, (May 11, 2021), 15 pages.

* cited by examiner

*Primary Examiner* — Hashem Farrokh
(74) *Attorney, Agent, or Firm* — Schwegman Lundberg & Woessner, P.A.

(57) ABSTRACT

Host and accelerator devices can be coupled using various interfaces, such as Compute Express Link (CXL). In an example, user applications can have protected access to a shared set of control parameters for different queues. A protocol can allow an application to use a unique memory page at the accelerator device through which the application can access control parameters, such as can be used to control memory-based communication queues or other queues. In an example, there can be multiple sets of control parameters in a single memory page. The protocol can allow views of the single memory page from respective different application processes. In an example, the protocol can include or use an access check to detect and handle unauthorized accesses to particular parameters.

26 Claims, 7 Drawing Sheets

CONTROL PARAMETER ADDRESS VIRTUALIZATION

STATEMENT REGARDING FEDERALLY SPONSORED RESEARCH OR DEVELOPMENT

This invention was made with Government support under Agreement No. DE-AC05-76RL01830, awarded by the US Department of Energy. The Government has certain rights in the invention.

TECHNICAL FIELD

Embodiments pertain to memory devices. Some embodiments pertain to address virtualization for accessing control parameters.

BACKGROUND

Memory devices for computers or other electronic devices may be categorized as volatile and non-volatile memory. Volatile memory requires power to maintain its data, and includes random-access memory (RAM), dynamic random-access memory (DRAM), or synchronous dynamic random-access memory (SDRAM), among others. Non-volatile memory can retain stored data when not powered, and includes flash memory, read-only memory (ROM), electrically erasable programmable ROM (EEPROM), static RAM (SRAM), erasable programmable ROM (EPROM), resistance variable memory, phase-change memory, storage class memory, resistive random-access memory (RRAM), and magnetoresistive random-access memory (MRAM), among others. Persistent memory is an architectural property of the system where the data stored in the media is available after system reset or power-cycling. In some examples, non-volatile memory media may be used to build a system with a persistent memory model.

Memory devices may be coupled to a host (e.g., a host computing device) to store data, commands, and/or instructions for use by the host while the computer or electronic system is operating. For example, data, commands, and/or instructions can be transferred between the host and the memory device(s) during operation of a computing or other electronic system.

Various protocols or standards can be applied to facilitate communication between a host and one or more other devices such as memory buffers, accelerators, or other input/output devices. In an example, an unordered protocol such as Compute Express Link (CXL) can be used to provide high-bandwidth and low-latency connectivity.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
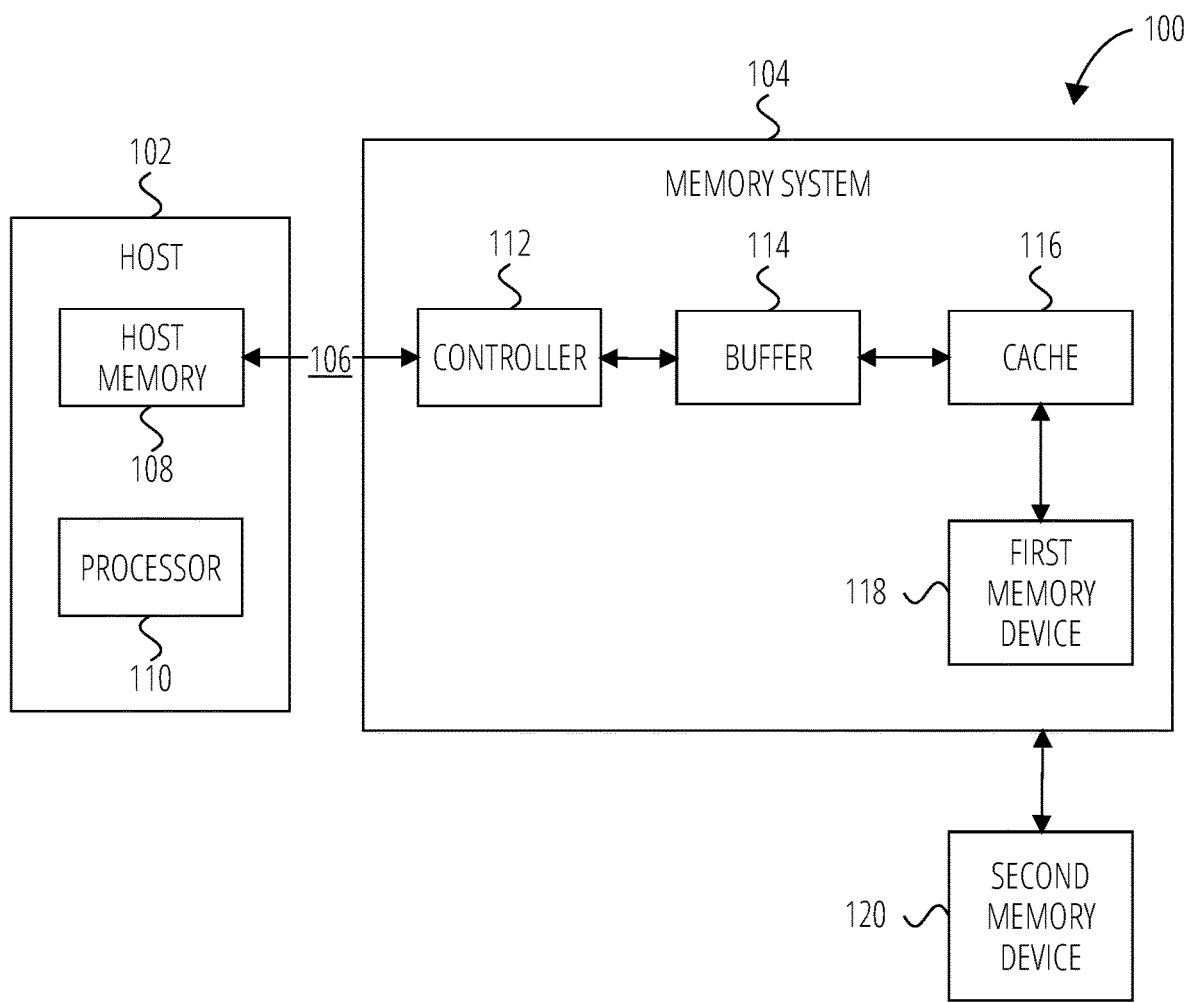
FIG. 1 illustrates generally a block diagram of an example computing system including a host and a memory device.

Compute Express Link (CXL) is an open standard interconnect configured for high-bandwidth, low-latency connectivity between host devices and other devices such as accelerators, memory buffers, and smart I/O devices. CXL was designed to facilitate high-performance computational workloads by supporting heterogeneous processing and memory systems. CXL enables coherency and memory semantics on top of PCI Express (PCIe)-based I/O semantics for optimized performance.

In some examples, CXL is used in applications such as artificial intelligence, machine learning, analytics, cloud infrastructure, edge computing devices, communication systems, and elsewhere. Data processing in such applications can use various scalar, vector, matrix and spatial architectures that can be deployed in CPU, GPU, FPGA, smart NICs, and other accelerators that can be coupled using a CXL link.

CXL supports dynamic multiplexing using a set of protocols that includes input/output (CXL.io, based on PCIe), caching (CXL.cache), and memory (CXL.memory) semantics. In an example, CXL can be used to maintain a unified, coherent memory space between the CPU (e.g., a host device or host processor) and any memory on the attached CXL device. This configuration allows the CPU and other device to share resources and operate on the same memory region for higher performance, reduced data-movement, and reduced software stack complexity. In an example, the CPU is primarily responsible for maintaining or managing coherency in a CXL environment. Accordingly, CXL can be leveraged to help reduce device cost and complexity, as well as overhead traditionally associated with coherency across an I/O link.

CXL runs on PCIe PHY and provides full interoperability with PCIe. In an example, a CXL device starts link training in a PCIe Gen 1 Data Rate and negotiates CXL as its operating protocol (e.g., using the alternate protocol negotiation mechanism defined in the PCIe 5.0 specification) if its link partner is capable of supporting CXL. Devices and platforms can thus more readily adopt CXL by leveraging the PCIe infrastructure and without having to design and validate the PHY, channel, channel extension devices, or other upper layers of PCIe.

In an example, CXL supports single-level switching to enable fan-out to multiple devices. This enables multiple devices in a platform to migrate to CXL, while maintaining backward compatibility and the low-latency characteristics of CXL.

In an example, CXL can provide a standardized compute fabric that supports pooling of multiple logical devices (MLD) and single logical devices such as using a CXL switch connected to several host devices or nodes (e.g., Root Ports). This feature enables servers to pool resources such as accelerators and/or memory that can be assigned according to workload. For example, CXL can help facilitate resource allocation or dedication and release. In an example, CXL can help allocate and deallocate memory to various host devices according to need. This flexibility helps designers avoid over-provisioning while ensuring best performance.

Some of the compute-intensive applications and operations mentioned herein can require or use large data sets. Memory devices that store such data sets can be configured for low latency and high bandwidth and persistence. One problem of a load-store interconnect architecture includes guaranteeing persistence. CXL can help address the problem using an architected flow and standard memory management interface for software, such as can enable movement of persistent memory from a controller-based approach to direct memory management.

The present inventors have recognized that a problem to be solved includes allowing multiple applications or application processes to have a unique memory page through which the application processes can access a single, shared page that stores control parameters. The present inventors have recognized that a solution to the control parameter access problem can include or use a remapping or virtualization of a physical memory resource to a virtual address space. In an example, the solution includes a virtualization technique that allows up to N processes to have respective memory pages through which each process can interface with its queue registers, such as in an accelerator device.

Systems, methods, and protocols discussed herein can help facilitate more flexible and efficient register storage and access, such as by allowing a physical memory resource to be remapped by, or on behalf of, an application, as different processes are dynamically spawned or retired. In an example, the solutions discussed herein can allow an application to virtualize register locations to a virtual address space. The solutions can further include or use a verification step to ensure that access to specific register locations is limited by a command manager to particular corresponding queues or applications. In an example, the verification step can use information in an address field of a command to help control register access, check for errors, or generate an error response message.

FIG. 1 illustrates generally a block diagram of an example of a computing system 100 including a host device 102 and a memory system 104. The host device 102 includes a central processing unit (CPU) or processor 110 and a host memory 108. In an example, the host device 102 can include a host system such as a personal laptop computer, a desktop computer, a digital camera, a smart phone, a memory card reader, and/or Internet-of-thing enabled device, among various other types of hosts, and can include a memory access device, e.g., the processor 110. The processor 110 can include one or more processor cores, a system of parallel processors, or other CPU arrangement.

The memory system 104 includes a controller 112, a buffer 114, a cache 116, and a first memory device 118. The first memory device 118 can include, for example, one or more memory modules (e.g., single in-line memory modules, dual in-line memory modules, etc.). The first memory device 118 can include volatile memory and/or non-volatile memory, and can include a multiple-chip device that comprises one or multiple different memory types or modules. In an example, the computing system 100 includes a second memory device 120 that interfaces with the memory system 104 and the host device 102.

The host device 102 can include a system backplane and can include a number of processing resources (e.g., one or more processors, microprocessors, or some other type of controlling circuitry). The computing system 100 can optionally include separate integrated circuits for the host device 102, the memory system 104, the controller 112, the buffer 114, the cache 116, the first memory device 118, the second memory device 120, any one or more of which may comprise respective chiplets that can be connected and used together. In an example, the computing system 100 includes a server system and/or a high-performance computing (HPC) system and/or a portion thereof. Although the example shown in FIG. 1 illustrates a system having a Von Neumann architecture, embodiments of the present disclosure can be implemented in non-Von Neumann architectures, which may not include one or more components (e.g., CPU, ALU, etc.) often associated with a Von Neumann architecture.

In an example, the first memory device 118 can provide a main memory for the computing system 100, or the first memory device 118 can comprise accessory memory or storage for use by the computing system 100. In an example, the first memory device 118 or the second memory device 120 includes one or more arrays of memory cells, e.g., volatile and/or non-volatile memory cells. The arrays can be flash arrays with a NAND architecture, for example. Embodiments are not limited to a particular type of memory device. For instance, the memory devices can include RAM, ROM, DRAM, SDRAM, PCRAM, RRAM, and flash memory, among others.

In embodiments in which the first memory device 118 includes persistent or non-volatile memory, the first memory device 118 can include a flash memory device such as a NAND or NOR flash memory device. The first memory device 118 can include other non-volatile memory devices such as non-volatile random-access memory devices (e.g., NVRAM, ReRAM, FeRAM, MRAM, PCM), "emerging" memory devices such as a ferroelectric RAM device that includes ferroelectric capacitors that can exhibit hysteresis characteristics, a 3-D Crosspoint (3D XP) memory device, etc., or combinations thereof.

In an example, the controller 112 comprises a media controller such as a non-volatile memory express (NVMe) controller. The controller 112 can be configured to perform operations such as copy, write, read, error correct, etc. for the first memory device 118. In an example, the controller 112 can include purpose-built circuitry and/or instructions to perform various operations. That is, in some embodiments, the controller 112 can include circuitry and/or can be configured to perform instructions to control movement of data and/or addresses associated with data such as among the buffer 114, the cache 116, and/or the first memory device 118 or the second memory device 120.

In an example, at least one of the processor 110 and the controller 112 comprises a command manager (CM) for the memory system 104. The CM can receive, such as from the host device 102, a read command for a particular logic row address in the first memory device 118 or the second memory device 120. In some examples, the CM can determine that the logical row address is associated with a first row based at least in part on a pointer stored in a register of the controller 112. In an example, the CM can receive, from the host device 102, a write command for a logical row address, and the write command can be associated with second data. In some examples, the CM can be configured to issue, to non-volatile memory and between issuing the read command and the write command, an access command associated with the first memory device 118 or the second memory device 120. In some examples, the CM can issue, to the non-volatile memory and between issuing the read command and the write command, an access command associated with the first memory device 118 or the second memory device 120.

In an example, the buffer 114 comprises a data buffer circuit that includes a region of a physical memory used to temporarily store data, for example, while the data is moved from one place to another. The buffer 114 can include a first-in, first-out (FIFO) buffer in which the oldest (e.g., the first-in) data is processed first. In some embodiments, the buffer 114 includes a hardware shift register, a circular buffer, or a list.

In an example, the cache 116 comprises a region of a physical memory used to temporarily store particular data that is likely to be used again. The cache 116 can include a pool of data entries. In some examples, the cache 116 can be configured to operate according to a write-back policy in which data is written to the cache without the being concurrently written to the first memory device 118. Accordingly, in some embodiments, data written to the cache 116 may not have a corresponding data entry in the first memory device 118.

In an example, the controller 112 can receive write requests involving the cache 116 and cause data associated with each of the write requests to be written to the cache 116. In some examples, the controller 112 can receive the write requests at a rate of thirty-two (32) gigatransfers (GT) per second, such as according to or using a CXL protocol. The controller 112 can similarly receive read requests and cause data stored in, e.g., the first memory device 118 or the second memory device 120, to be retrieved and written to, for example, the host device 102 via the interface 106.

In an example, the interface 106 can include any type of communication path, bus, or the like that allows for information to be transferred between the host device 102 and the memory system 104. Non-limiting examples of interfaces can include a peripheral component interconnect (PCI) interface, a peripheral component interconnect express (PCIe) interface, a serial advanced technology attachment (SATA) interface, and/or a miniature serial advanced technology attachment (mSATA) interface, among others. In an example, the interface 106 includes a PCIe 5.0 interface that is compliant with the compute express link (CXL) protocol standard. Accordingly, in some embodiments, the interface 106 supports transfer speeds of at least 32 GT/s.

As similarly described elsewhere herein, CXL is a high-speed central processing unit (CPU)-to-device and CPU-to-memory interconnect designed to enhance compute performance. CXL technology maintains memory coherency between the CPU memory space (e.g., the host memory 108) and memory on attached devices or accelerators (e.g., the first memory device 118 or the second memory device 120), which allows resource sharing for higher performance, reduced software stack complexity, and lower overall system cost. CXL is designed to be an industry open standard interface for high-speed communications as accelerators are increasingly used to complement CPUs in support of emerging data-rich and compute-intensive applications such as artificial intelligence and machine learning.

Figure 2:
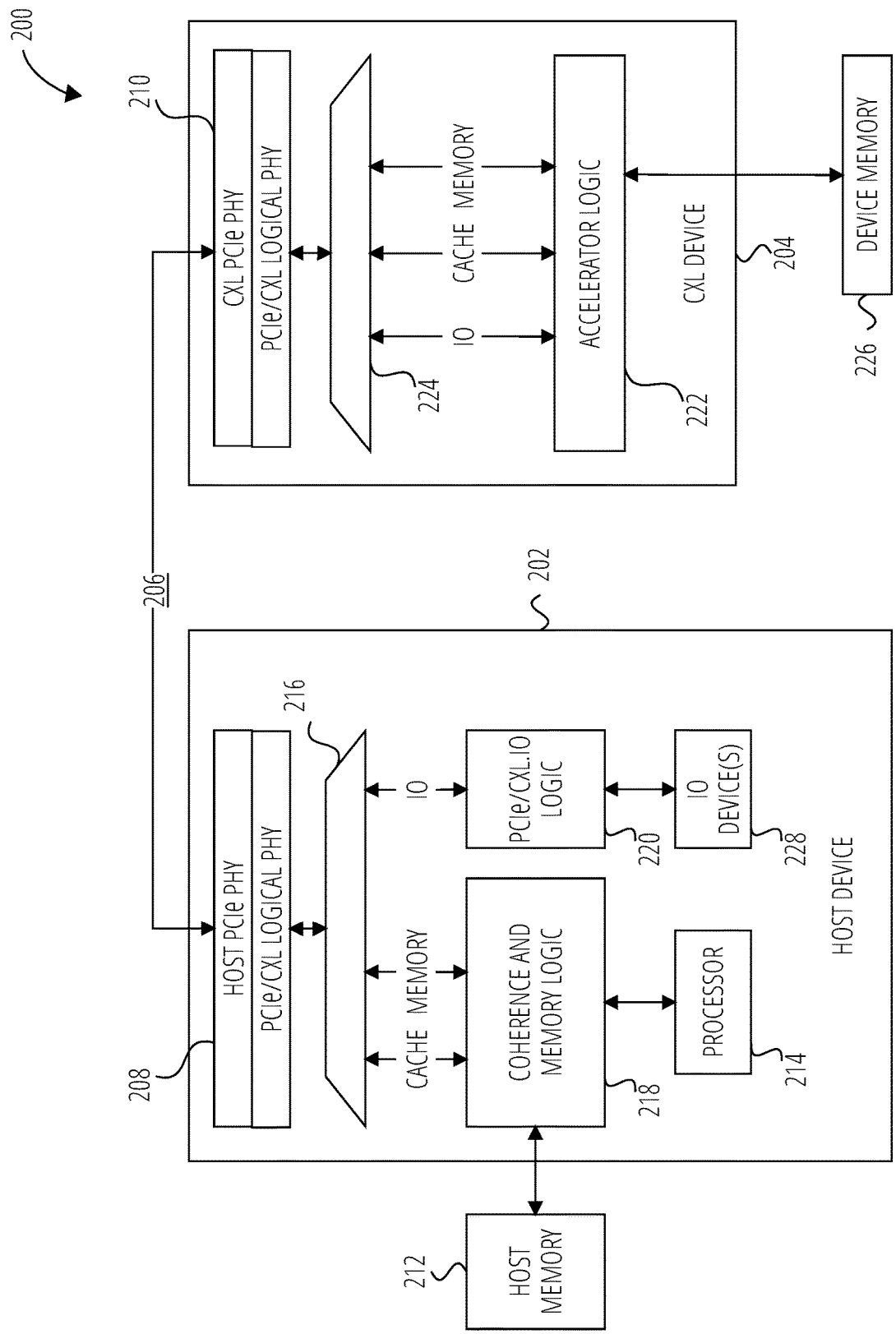
FIG. 2 illustrates generally an example of a compute express link (CXL) system.

FIG. 2 illustrates generally an example of a CXL system 200 that uses a CXL link 206 to connect a host device 202 and a CXL device 204. In an example, the host device 202 comprises or corresponds to the host device 102 and the CXL device 204 comprises or corresponds to the memory system 104 from the example of the computing system 100 in FIG. 1. A memory system command manager can comprise a portion of the host device 202 or the CXL device 204. In an example, the CXL link 206 can support communications using multiplexed protocols for caching (e.g., CXL.cache), memory accesses (e.g., CXL.mem), and data input/output transactions (e.g., CXL.io). CXL.io can include a protocol based on PCIe that is used for functions such as device discovery, configuration, initialization, I/O virtualization, and direct memory access (DMA) using non-coherent load-store, producer-consumer semantics. CXL.cache can enable a device to cache data from the host memory (e.g., from the host memory 212) using a request and response protocol. CXL.memory can enable the host device 202 to use memory attached to the CXL device 204, for example, in or using a virtualized memory space. In an example, CXL.memory transactions can be memory load and store operations that run downstream from or outside of the host device 202.

In the example of FIG. 2, the host device 202 includes a host processor 214 (e.g., comprising one or more CPUs or cores) and 10 device(s) 228. The host device 202 can comprise, or can be coupled to, host memory 212. The host device 202 can include various circuitry or logic configured to facilitate CXL-based communications and transactions with the CXL device 204. For example, the host device 202 can include coherence and memory logic 218 configured to implement transactions according to CXL.cache and CXL.mem semantics, and the host device 202 can include PCIe logic 220 configured to implement transactions according to CXL.io semantics. In an example, the host device 202 can be configured to manage coherency of data cached at the CXL device 204 using, e.g., its coherence and memory logic 218.

The host device 202 can further include a host multiplexer 216 configured to modulate communications over the CXL link 206 (e.g., using the PCIe PHY layer). The multiplexing of protocols ensures that latency-sensitive protocols (e.g., CXL.cache and CXL.memory) have the same or similar latency as a native processor-to-processor link. In an example, CXL defines an upper bound on response times for latency-sensitive protocols to help ensure that device performance is not adversely impacted by variation in latency between different devices implementing coherency and memory semantics.

In an example, symmetric cache coherency protocols can be difficult to implement between host processors because different architectures may use different solutions, which in turn can compromise backward compatibility. CXL can address this problem by consolidating the coherency function at the host device 202, such as using the coherence and memory logic 218.

The CXL device 204 can include an accelerator device that comprises various accelerator logic 222. In an example, the CXL device 204 can comprise, or can be coupled to, CXL device memory 226. The CXL device 204 can include various circuitry or logic configured to facilitate CXL-based communications and transactions with the host device 202 using the CXL link 206. For example, the accelerator logic 222 can be configured to implement transactions according to CXL.cache, CXL.mem, and CXL.io semantics. The CXL device 204 can include a CXL device multiplexer 224 configured to control communications over the CXL link 206.

In an example, one or more of the coherence and memory logic 218 and the accelerator logic 222 comprises a Unified Assist Engine (UAE) or compute fabric with various functional units such as a command manager (CM), Threading Engine (TE), Streaming Engine (SE), Data Manager or data mover (DM), or other unit. The compute fabric can be reconfigurable and can include separate synchronous and asynchronous flows.

The accelerator logic 222 or portions thereof can be configured to operate in an application space of the CXL system 200 and, in some examples, can initiate its own threads or sub-threads, which can operate in parallel and can optionally use resources or units on other CXL devices 204. Queue and transaction control through the system can be coordinated by the CM, TE, SE, or DM components of the UAE. In an example, each queue or thread can map to a different loop iteration to thereby support multi-dimensional loops. With the capability to initiate such nested loops, among other capabilities, the system can realize significant time savings and latency improvements for compute-intensive operations.

Control registers, such as for a host or accelerator device, can be statically located in a memory address space. In some examples, maintaining registers in static locations can complicate access and increase latency, such as by requiring or using location pointers for each of multiple applications to access the different register locations. Other control mechanisms may be needed or used to control access to particular register locations or check for errors.

Systems, methods, and protocols discussed herein can help facilitate more flexible and efficient register storage and access, such as by allowing a physical memory resource to be remapped by, or on behalf of, one or more applications. In an example, memory in a device, such as the CXL device 204, can be mapped as memory-mapped input-output (MMIO) such as using CXL.io semantics. In an example, an application running on the host device 202 can use a memory page, such as in MMIO space on the CXL device 204, to access a shared page at the CXL device 204 memory that contains control parameters or other information. Protocols and hardware discussed herein can be configured to ensure that a particular host application or process can access parameters for queues belonging to the particular application. For example, the protocols can include or use a device command manager (CM) to perform a verification step to prevent the particular application from accessing a register that includes a parameter set for a queue that belongs to a different application or different application process. Failure at the verification step can return an error response, such as including zeroed data or a different response message, that can be handled by the application.

Figure 3:
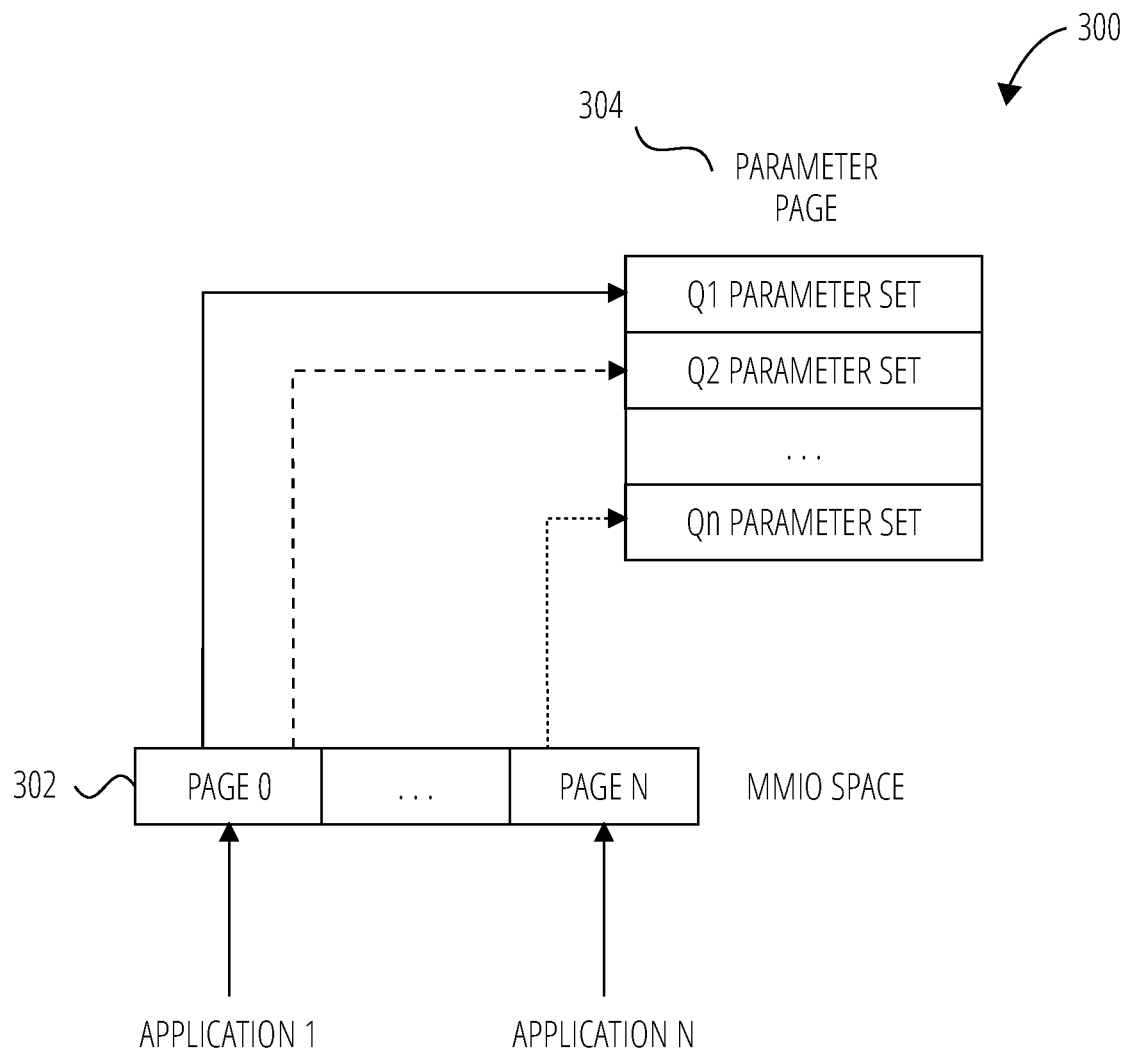
FIG. 3 illustrates generally an example of applications accessing control parameters via respective different virtual memory pages.

FIG. 3 illustrates generally a control parameter storage example 300. The control parameter storage example 300 shows that multiple queue parameters, or parameter sets, can be stored in a single parameter page 304, such as can include a physical memory page. The physical memory page can be stored at the CXL device 204 or elsewhere. In the example of FIG. 3, the parameter page 304 includes parameter sets for multiple queues, such as queues Q1 through Qn. The different parameter sets can be separately addressable, for example, using a base address to reference the parameter page 304, and using an address offset to identify a particular portion of the parameter page 304 for a specific one of the parameter sets.

The queue parameters stored in the parameter page 304 can be accessed via different pages (e.g., physical pages) of other memory. In an example, applications can use respective different pages to access application-specific queue parameters.

The control parameter storage example 300 illustrates generally a first application (Application 1) and a Nth application (Application N). Fewer or additional applications can similarly be used. In the example of FIG. 3, the first application can access its corresponding parameters, such as stored in a first portion of the parameter page 304, through a physical memory page, Page 0. In an example, Page 0 can be a page in a memory-mapped input-output space (MMIO space 302) of an accelerator device such as the CXL device 204. In an example, Page 0 can be a page that is unique or specific to Application 1. The Nth application can access its own corresponding parameters, such as stored in an Nth portion of the parameter page 304, through a physical memory page, Page N. Page N can be a page in the MMIO space 302 of the same accelerator device where the parameter sets are stored.

In an example, access from the different applications to respective portions of the parameter page 304 can be controlled such that control parameters for queues spawned from, or belonging to, particular application processes can be accessed only by the particular application. That is, according to the systems and methods discussed herein, a particular application can be prevented from accessing control parameters for queues that do not belong to the same particular application. In the example of FIG. 3, for example, requests from the Nth application to access the first parameter set can be denied, while requests from the Nth application to access the nth parameter set can be allowed.

In an example, the address offset introduced above can be used by a command manager to distinguish between valid and invalid access attempts to the parameter page 304. The address offset is sometimes referred to as an index. The systems and methods discussed herein thus selectively allow an application to access one or more queue parameters (while denying access to other parameters), and those parameters are mapped to a single physical page (e.g., the parameter page 304), which in turn can be mapped into a virtual address space of the application. In an example, the virtual address to physical address mapping can remain constant or unchanged as queues are initiated and terminated, while application access to specific parameters can be updated or changed as queues are initiated and terminated.

Figure 4:
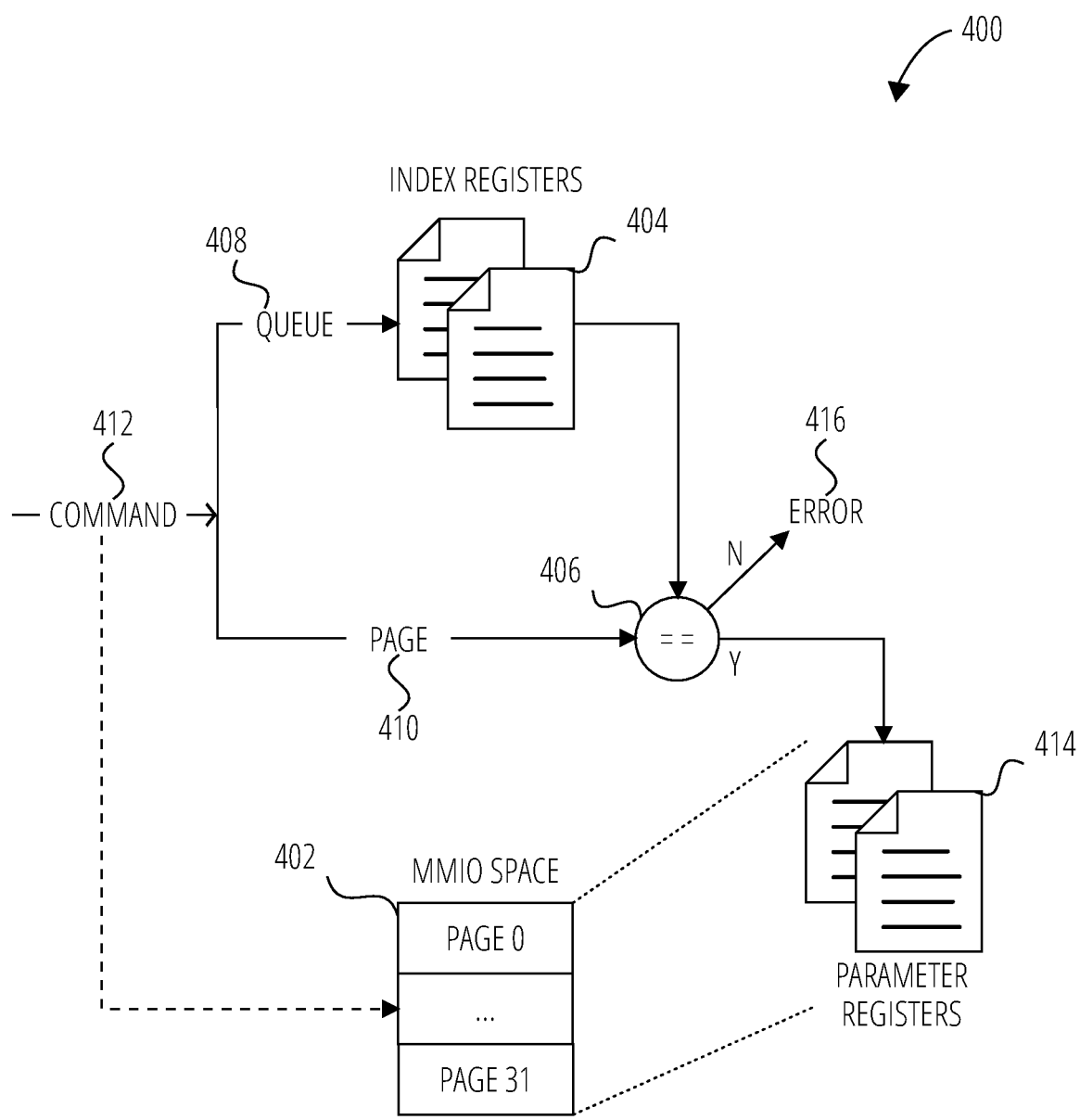
FIG. 4 illustrates generally an example of memory page virtualization for an accelerator device.

FIG. 4 illustrates generally a memory page virtualization example 400 that can include or use an MMIO space 402 of an accelerator such as the CXL device 204. The MMIO space 402 can include parameter registers 414 that store control information for various queues that can be executed at least in part by the accelerator. That is, the parameter registers 414 can include a physical page of memory that stores control parameters or parameter sets for the queues. In an example, a host device or application can access the control information using commands 412 issued to the accelerator, such as using CXL.io semantics.

In an example, parameters that define access to respective memory-based communication queues can be assigned to respective, contiguous MMIO addresses at the CXL device 204, such as in the MMIO space 402. In an example, the MMIO space 402 includes MMIO pages (e.g., 32 pages, PAGE 0 through PAGE 31, or a different number of pages) that reference respective queue-specific control parameters (e.g., at the page comprising the parameter registers 414). Each host application process that owns a host queue can access its corresponding queue parameters through a page in the MMIO space 402, and such MMIO pages can be managed by system software. In an example, the pages in the MMIO space 402 can be allocated at the CXL device 204 upon application process creation. Generally, different applications can be configured to access only their respective own parameters in the parameter registers 414. In some examples, applications can be configured or allowed to access the same portion of the parameter registers 414.

In an example, the page accessed via the MMIO space 402 can store control parameters for multiple queues. For example, respective control parameters, e.g., for 32 different queues, can be stored in a 4 kilobit page comprising the parameter registers 414. To access particular parameters, an application can index into the corresponding page using a command 412 that includes a queue number and a register offset or page address 410. In an example, the queue number is a queue identifier 408 that is assigned by the application or CM at process initiation. In an example, the page address 410 identifies the particular address of the memory page that comprises the parameter registers 414.

In an example, each page in the MMIO space 402 can be associated with a respective view index. The view index can comprise a multiple-bit field in a command, such as a 5-bit field in the command 412. In an example, the view index can comprise an offset address portion above a page address (e.g., the view index can correspond to bits [16:12] of an address, and the page identifier can correspond to bits [11:0], in the MMIO space 402).

View indexes can be programmed into respective control status registers (CSR) that are associated with respective queues. The view indexes can be provided or stored in index registers 404, such as can include registers maintained in kernel space for the accelerator. Registers in the kernel space, or control registers, can be protected from and unexposed to host applications. In an example, the value of a particular view index, or values of multiple view indexes, stored in the index registers 404 can be programmed upon queue allocation or process initiation by a host application.

In an example, an application can use a software-assigned view index to access a particular parameter register in the index registers 404 for a particular queue. For example, for a first queue, the application can send the command 412 to the MMIO space 402, such as can include a virtual address space for routing the command 412 to the parameter registers 414. The command 412 can be configured to access a control parameter from a particular entry in the parameter registers 414. The command 412 can include the view index for the requested register in the form of the page address 410, and the command 412 can include the queue identifier 408 to identify the command 412 as corresponding to a particular queue, such as the first queue. As similarly described above, the view index can be a value that was previously assigned to the first queue, such as assigned by the application at process initiation. In an example, the command manager can retrieve the corresponding, queue-specific view index from the index registers 404 and then use an evaluator 406 (e.g., a logical comparator circuit) to check the view index, or page address 410, from the command 412 for correspondence with the retrieved view index from the index registers 404. If the view index from the command 412 does not match the view index retrieved from the index registers 404, then the command manager can inhibit or deny access to the requested register or page in the parameter registers 414, and an error message 416 can be generated and returned to the application. In this case, contents of the requested register may not be read or modified, and the returned data can be zeroed or null. If, on the other hand, the view index from the command 412 matches the view index retrieved from the index registers 404, then the command manager can allow access to the requested register in the parameter registers 414, and the contents of the register can be read or changed.

An application can thus have or use a unique memory page (e.g., in the MMIO space 402) to access control parameters (e.g., in the parameter registers 414), such as can control one or more memory-based communication queues. In an example, at the MMIO space 402, there can be multiple references or pointers to parameters stored in a single page comprising the parameter registers 414, such as on the CXL device 204. Using the protocol discussed herein, an application can access, via the MMIO space 402, specific queue parameters as queues are initiated or terminated. The MMIO space 402 of the device can thus be a virtual address space representing the centralized location of control parameters. The contents of the addressed control parameter memory space can optionally be updated or revised by an application, kernel process, or other mechanism.

Figure 5:
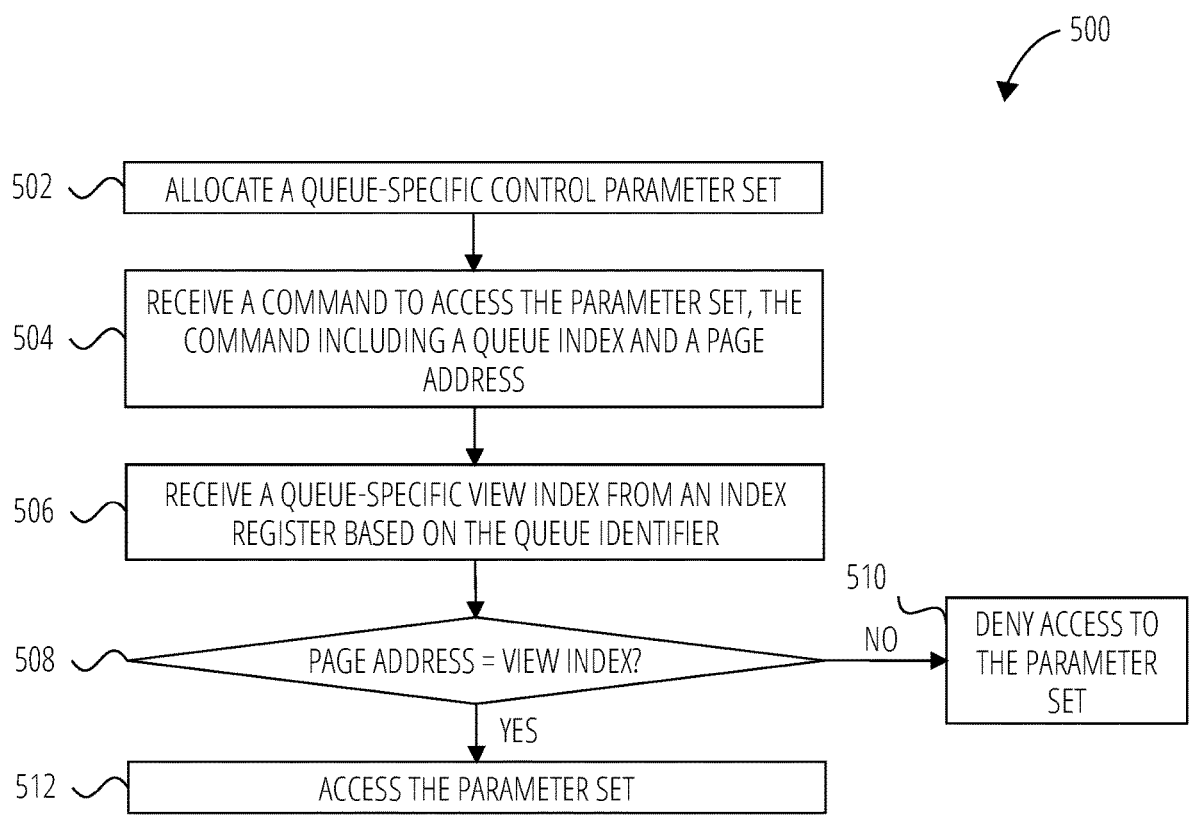
FIG. 5 illustrates generally an example of a conditional, control parameter access method for an accelerator device.

FIG. 5 illustrates generally an example of a conditional parameter access method 500. The conditional parameter access method 500 can be performed using, for example, a command manager of an accelerator device such as the CXL device 204. In an example, the command manager can receive commands or requests from a host device and, in response, access various control parameters from device-local or remote registers to perform processes defined by the commands.

At block 502, the conditional parameter access method 500 can include allocating a queue-specific control parameter set comprising control parameters for, e.g., the CXL device 204. In an example, block 502 can include allocating multiple memory pages in an MMIO space of the accelerator device, and each different page in the MMIO space can correspond to a different application. That is, control parameters for different queues can be stored in different pages in the MMIO space, and the different MMIO space pages can be dedicated to respective different applications.

At block 504, the conditional parameter access method 500 can include receiving a command to access a parameter set that was allocated at block 502. In an example, the command is addressed to the MMIO space 402 and can include a queue identifier or queue index, and the command can include a page address. The queue identifier can include one or more bits in the command that identifies the queue to which the command belongs. The page address can include one or more bits in the command that identifies the particular memory page, such as comprising the parameter registers 414, that holds the control parameter or other information of interest for the command.

At block 506, the conditional parameter access method 500 can include receiving or retrieving a view index from an index register. For example, block 506 can include or use the command manager to access the view index from an index register using the queue index information from the command (e.g., the command received at block 504).

At decision block 508, the conditional parameter access method 500 can include evaluating whether the page address information from the command (e.g., received at block 504) corresponds to the view index from the index register (e.g., received at block 506). If the page address matches or corresponds to the view index, then the example can continue at block 512 with accessing the parameter set indicated by the command. If, however, the page address does not match or correspond to the view index, then the example can continue at block 510. At block 510, access to the parameter set indicated by the command can be denied, and an error message can be returned to the CM or the application. Such an error can be detected by, e.g., a runtime library, that can terminate the application or take other corrective action.

Figure 6:
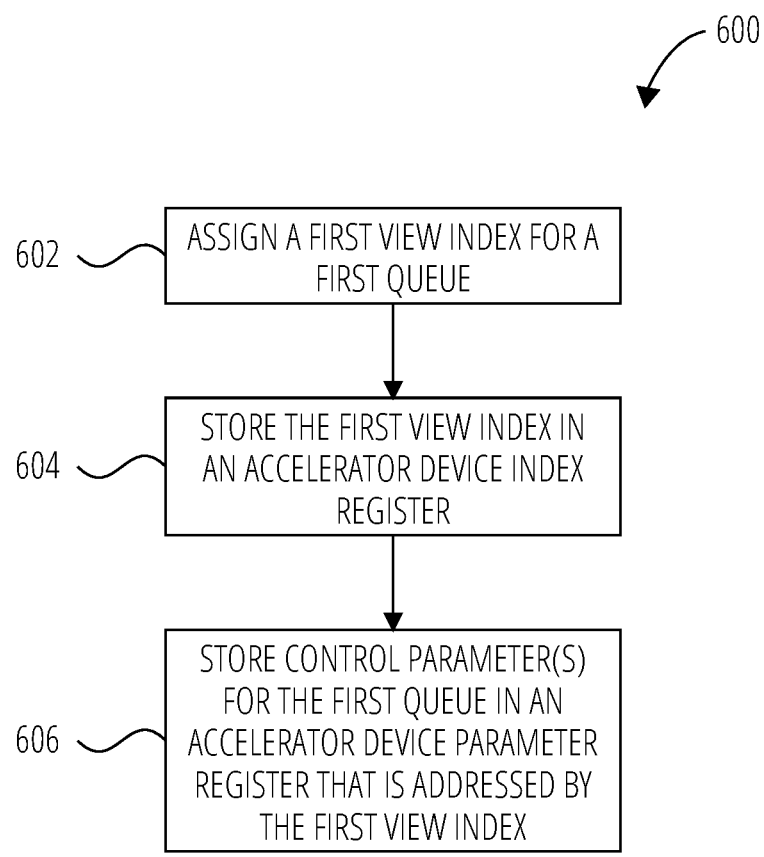
FIG. 6 illustrates generally an example of a control parameter allocation method.

FIG. 6 illustrates generally an example of a control parameter allocation method 600. In an example, the control parameter allocation method 600 can correspond to or comprise block 502 of the conditional parameter access method 500.

In the control parameter allocation method 600, block 602 can include assigning a first view index for a first queue. For example, block 602 can include using a host application to assign a particular value or index that corresponds to a first queue that is initiated by the application. The first view index can include a unique indicator, or register identifier, of a particular page or location that can be address via an MMIO space of an accelerator device. In an example, the first view index includes a register offset that identifies a particular location in the page of the MMIO space and refers to a particular register location in a memory page that comprises the parameter registers 414.

At block 604, the control parameter allocation method 600 can include storing the first view index in an index register of the accelerator device. That is, the first view index can be a multiple-bit value that populates a CSR that is associated with the first queue. In an example, the address of the particular register for the first view index can be maintained in accelerator kernel space.

At block 606, the control parameter allocation method 600 can include storing control parameter(s) for the first queue in a parameter register of the accelerator device. The parameter register can be addressed based on the first view index assigned to the first queue. The parameter register and the index register can comprise different registers in, e.g., the accelerator device, or can be stored elsewhere.

Figure 7:
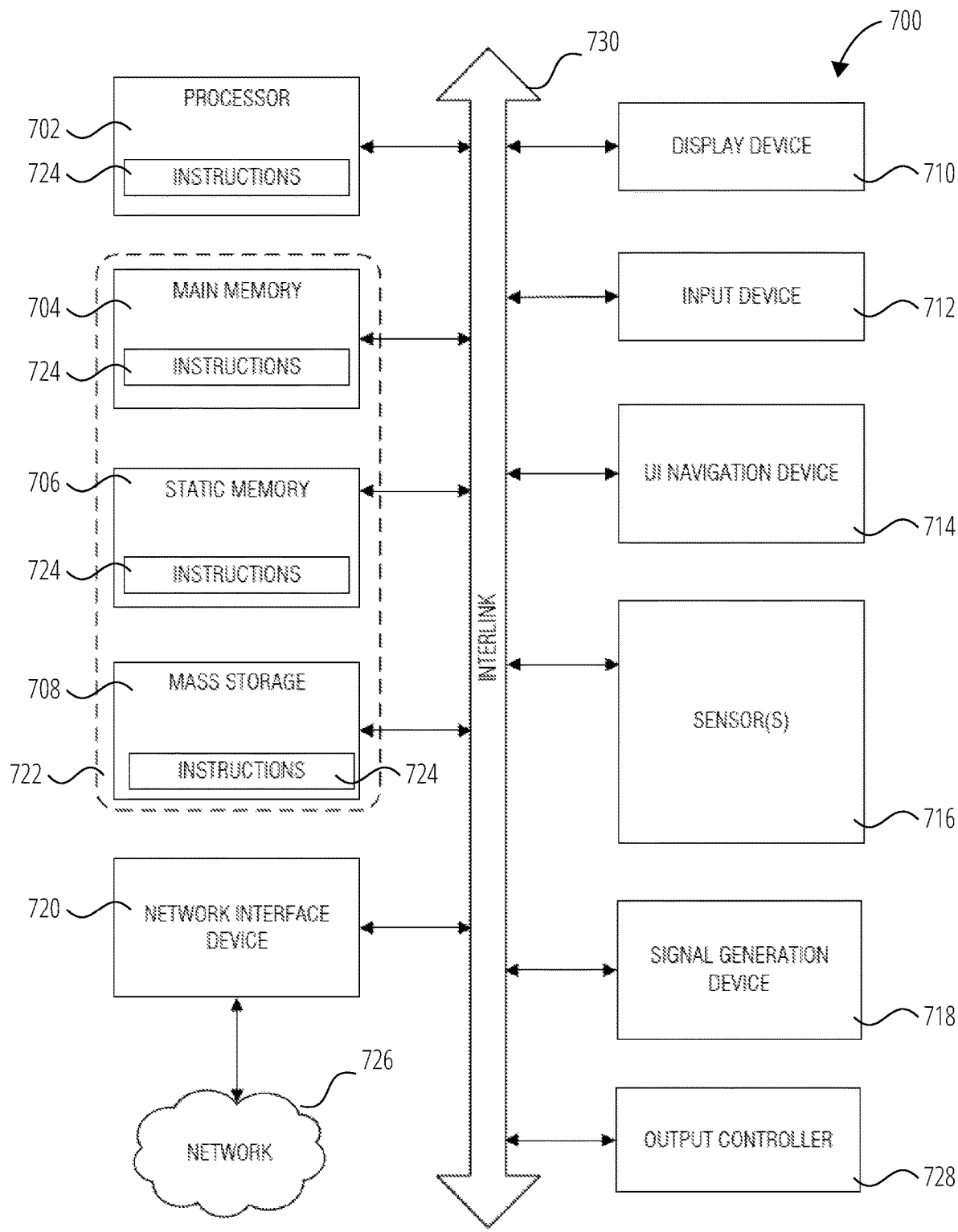
FIG. 7 illustrates a block diagram of an example machine with which, in which, or by which any one or more of the techniques discussed herein can be implemented.

FIG. 7 illustrates a block diagram of an example machine 700 with which, in which, or by which any one or more of the techniques (e.g., methodologies) discussed herein can be implemented. Examples, as described herein, can include, or can operate by, logic or a number of components, or mechanisms in the machine 700. Circuitry (e.g., processing circuitry) is a collection of circuits implemented in tangible entities of the machine 700 that include hardware (e.g., simple circuits, gates, logic, etc.). Circuitry membership can be flexible over time. Circuitries include members that can, alone or in combination, perform specified operations when operating. In an example, hardware of the circuitry can be immutably designed to carry out a specific operation (e.g., hardwired) for example using a PCIe or CXL interface. In an example, the hardware of the circuitry can include variably connected physical components (e.g., execution units, transistors, simple circuits, etc.) including a machine-readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. In an example, any of the physical components can be used in more than one member of more than one circuitry. For example, under operation, execution units can be used in a first circuit of a first circuitry at one point in time and reused by a second circuit in the first circuitry, or by a third circuit in a second circuitry at a different time.

In alternative embodiments, the machine 700 can operate as a standalone device or can be connected (e.g., networked) to other machines. In a networked deployment, the machine 700 can operate in the capacity of a server machine, a client machine, or both in server-client network environments. In an example, the machine 700 can act as a peer machine in peer-to-peer (P2P) (or other distributed) network environment. The machine 700 can be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Any one or more of the components of the machine 700 can include or use one or more instances of the host device 202 or the CXL device 204 or other component in or appurtenant to the computing system 100. The machine 700 (e.g., computer system) can include a hardware processor 702 (e.g., the host processor 214, the accelerator logic 222, a central processing unit (CPU), a graphics processing unit (GPU), a hardware processor core, or any combination thereof), a main memory 704, a static memory 706 (e.g., memory or storage for firmware, microcode, a basic-input-output (BIOS), unified extensible firmware interface (UEFI), etc.), and mass storage device 708 or memory die stack, hard drives, tape drives, flash storage, or other block devices) some or all of which can communicate with each other via an interlink 730 (e.g., bus). The machine 700 can further include a display device 710, an alphanumeric input device 712 (e.g., a keyboard), and a user interface (UI) Navigation device 714 (e.g., a mouse). In an example, the display device 710, the input device 712, and the UI navigation device 714 can be a touch screen display. The machine 700 can additionally include a mass storage device 708 (e.g., a drive unit), a signal generation device 718 (e.g., a speaker), a network interface device 720, and one or more sensor(s) 716, such as a global positioning system (GPS) sensor, compass, accelerometer, or other sensor. The machine 700 can include an output controller 728, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the hardware processor 702, the main memory 704, the static memory 706, or the mass storage device 708 can be, or include, a machine-readable media 722 on which is stored one or more sets of data structures or instructions 724 (e.g., software) embodying or used by any one or more of the techniques or functions described herein. The instructions 724 can also reside, completely or at least partially, within any of registers of the hardware processor 702, the main memory 704, the static memory 706, or the mass storage device 708 during execution thereof by the machine 700. In an example, one or any combination of the hardware processor 702, the main memory 704, the static memory 706, or the mass storage device 708 can constitute the machine-readable media 722. While the machine-readable media 722 is illustrated as a single medium, the term "machine-readable medium" or "computer-readable storage medium" or the like can include a single medium or multiple media (e.g., a centralized or distributed database, or associated caches and servers) configured to store the one or more instructions 724.

The term "machine readable medium" or "computer-readable storage medium" or the like can include any medium that is capable of storing, encoding, or carrying instructions for execution by the machine 700 and that cause the machine 700 to perform any one or more of the techniques of the present disclosure, or that is capable of storing, encoding or carrying data structures used by or associated with such instructions. Non-limiting machine-readable medium examples can include solid-state memories, optical media, magnetic media, and signals (e.g., radio frequency signals, other photon-based signals, sound signals, etc.). In an example, a non-transitory machine-readable medium comprises a machine-readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media can include: non-volatile memory, such as semiconductor memory devices (e.g., electrically programmable read-only memory (EPROM), electrically erasable programmable read-only memory (EEPROM)) and flash memory devices; magnetic disks, such as internal hard disks and removable disks; magneto-optical disks; and CD-ROM and DVD-ROM disks.

In an example, information stored or otherwise provided on the machine-readable media 722 can be representative of the instructions 724, such as instructions 724 themselves or a format from which the instructions 724 can be derived. This format from which the instructions 724 can be derived can include source code, encoded instructions (e.g., in compressed or encrypted form), packaged instructions (e.g., split into multiple packages), or the like. The information representative of the instructions 724 in the machine-readable media 722 can be processed by processing circuitry into the instructions to implement any of the operations discussed herein. For example, deriving the instructions 724 from the information (e.g., processing by the processing circuitry) can include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions 724.

In an example, the derivation of the instructions 724 can include assembly, compilation, or interpretation of the information (e.g., by the processing circuitry) to create the instructions 724 from some intermediate or preprocessed format provided by the machine-readable media 722. The information, when provided in multiple parts, can be combined, unpacked, and modified to create the instructions 724. For example, the information can be in multiple compressed source code packages (or object code, or binary executable code, etc.) on one or several remote servers. The source code packages can be encrypted when in transit over a network and decrypted, uncompressed, assembled (e.g., linked) if necessary, and compiled or interpreted (e.g., into a library, stand-alone executable etc.) at a local machine, and executed by the local machine.

The instructions 724 can be further transmitted or received over a communications network 726 using a transmission medium via the network interface device 720 utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), plain old telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 720 can include one or more physical jacks (e.g., Ethernet, coaxial, or phone jacks) or one or more antennas to connect to the network 726. In an example, the network interface device 720 can include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 700, and includes digital or analog communications signals or other intangible medium to facilitate communication of such software. A transmission medium is a machine readable medium.

To better illustrate the methods and apparatuses described herein, a non-limiting set of Example embodiments are set forth below as numerically identified Examples.

Example 1 includes a method comprising requesting access to a first memory page using a command that includes a first queue index and a first page address, wherein the first memory page comprises control parameters for one or more queues including control parameters for a first queue associated with the first queue index. Example 1 can include receiving a first view index from an index register, the first view index corresponding to the first queue index, and determining whether the first view index from the index register corresponds to the first page address of the command, and, responsive to the first view index from the index register corresponding to the first page address of the command, allowing access to a portion of the first memory page that includes the control parameters for the first queue.

In Example 2, the subject matter of Example 1 can include allocating the parameter memory page and populating portions of the parameter memory page with control parameters for the first queue and for one or more other queues.

In Example 3, the subject matter of Example 2 can include allocating the parameter memory page including allocating a page in a memory-mapped input-output (MMIO) space for an accelerator device that uses a compute express link (CXL) interconnect to communicate with a host device.

In Example 4, the subject matter of any one or more of any one or more of Examples 1-3 can include or use responsive to the first view index from the index register not corresponding to the first page address of the command, denying access to the portion of the first memory page that includes the control parameters for the first queue.

In Example 5, the subject matter of Example 4 can include requesting access to the first memory page based on instructions from a first application, and denying access to the portion of the first memory page can comprise returning an error message to the application.

In Example 6, the subject matter of any one or more of Examples 1-5 can include receiving the first view index including using a command manager to retrieve the first view index from a control register.

In Example 7, the subject matter of any one or more of Examples 1-6 can include populating the index register with the first view index in response to initiation of the first queue.

In Example 8, the subject matter of any one or more of Examples 1-7 can include receiving the first view index from the index register including receiving a multiple-bit page identifier, and determining whether the first view index corresponds to the first page address can include determining whether the first page address matches the multiple-bit page identifier.

In Example 9, the subject matter of any one or more of Examples 1-8 can include the first page address indicating the first memory page, and the first view index can include a register offset that indicates a particular location in the first memory page.

In Example 10, the subject matter of any one or more of Examples 1-9 can include populating the index register with the first view index and associating the first view index with the first queue index.

In Example 11, the subject matter of any one or more of Examples 1-10 can include requesting access to the portion of the first memory page using a second command that includes the first queue index and a second page address, retrieving the first view index from a control register using the first queue index, and conditionally granting or inhibiting access to the portion of the first memory page based on a determined correspondence between the first view index and the second page address.

In Example 12, the subject matter of any one or more of Examples 1-11 can include requesting access to a second portion of the first memory page using a third request that includes a second queue index and the first page address, retrieving a second view index from the index register using the second queue index, determining whether the second view index from the index register corresponds to the first page address of the third request, and responsive to determining the second view index from the index register corresponds to the first page address, allowing access to the second portion of the first memory page, and responsive to determining the second view index from the index register does not correspond to the first page address, inhibiting access to the second portion of the first memory page.

Example 13 can include a system comprising a host device configured to execute an application comprising one or more application processes using one or more queues, and an accelerator device communicatively coupled with the host device, the accelerator device comprising a memory device configured to store control parameters for the one or more queues. In Example 13, the accelerator device can be configured to, responsive to a first application process of the application, populate a first portion of a first memory page in the memory device, the first memory page comprising control parameters for each of multiple queues belonging to the application including control parameters for a first queue, the first queue corresponding to a first queue index, and can be configured to receive an access request to the first memory page using a request command that includes the first queue index and a first page address, and retrieve a first view index from an index register using the first queue index, and determine whether the first view index from the index register corresponds to the first page address of the request command. Responsive to the first view index from the index register corresponding to the first page address of the request command, the accelerator device can be configured to allow access to a portion of the first memory page that includes the control parameters for the first queue.

In Example 14, the subject matter of Example 13 can include or use the accelerator device configured to deny access to the portion of the first memory page when the first view index does not correspond to the first page address of the request command.

In Example 15, the subject matter of Example 14 can include or use the accelerator device configured to send an error message to the host device when the accelerator device denies access to the first memory page.

In Example 16, the subject matter of any one or more of Examples 13-15 can include or use the accelerator device comprising a logical comparator circuit configured to determine whether bits in the first view index from the index register match corresponding bits in the first page address of the request command.

In Example 17, the subject matter of any one or more of Examples 13-16 can include or use the accelerator device coupled to the host device using a compute express link (CXL) interconnect.

In Example 18, the subject matter of Example 17 can include or use the first memory page in the memory device comprising a memory-mapped input-output (MMIO) space of the accelerator device.

In Example 19, the subject matter of Example 18 can include or use the host device configured to access the MMIO space of the accelerator device using the access request.

In Example 20, the subject matter of any one or more of Examples 13-19 can include or use the index register comprising a kernel register or control register.

Example 21 can include a non-transitory computer-readable storage medium, the computer-readable storage medium including instructions that when executed by a computer, cause the computer to: request access to a first memory page of an accelerator device using a command that includes, a queue index and a page address, and to use the queue index to retrieve a first view index from an index register in a kernel space of the accelerator device, the first view index corresponding to the queue index, and based on correspondence between the page address and the first view index, conditionally allow or deny access to a control register corresponding to the page address, wherein the control register comprises a portion of the first memory page.

In Example 22, the subject matter of Example 21 can include or use instructions to further configure the computer to: determine whether the first view index from the index register corresponds to the first page address of the command, and responsive to the first view index from the index register matching the page address of the command, allow access to the control register, and responsive to the first view index from the index register not matching the page address of the command, deny access to the control register and provide an error message.

In Example 23, the subject matter of any one or more of Examples 21-22 can include or use instructions that further configure the computer to populate the index register with the first view index in response to initiation of the first queue, wherein the first queue corresponds to the queue index.

In Example 24, the subject matter of any one or more of Examples 21-23 can include or use instructions that further configure the computer to allocate the portion of the first memory page in a memory-mapped input-output (MMIO) space of an accelerator device, wherein the portion of the first memory page comprises the control register.

In Example 25, the subject matter of any one or more of Examples 21-24 can include the first view index including a register offset that identifies a particular location in the first memory page.

In Example 26, the subject matter of any one or more of Examples 21-25 can include or use instructions that further configure the computer to, responsive to initiation of a first application process, populate the index register with the first view index and associate the first view index with the queue index.

Example 27 is at least one machine-readable medium including instructions that, when executed by processing circuitry, cause the processing circuitry to perform operations to implement of any of any one or more of Examples 1-20.

Example 28 is an apparatus comprising means to implement of any of any one or more of Examples 1-26.

Example 29 is a system to implement of any of any one or more of Examples 1-26. Example 30 is a method to implement of any of any one or more of Examples 1-26.

Each of these non-limiting examples can stand on its own, or can be combined in various permutations or combinations with one or more of the other examples.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" can include "A but not B," "B but not A," and "A and B," unless otherwise indicated. In the appended claims, the terms "including" and "in which" are used as the plain-English equivalents of the respective terms "comprising" and "wherein". Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) can be used in combination with each other. Other embodiments can be used, such as by one of ordinary skill in the art upon reviewing the above description. It is submitted with the understanding that it will not be used to interpret or limit the scope or meaning of the claims. Also, in the above Detailed Description, various features can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A method comprising:
   requesting access to a first memory page using a command that includes a first queue index and a first page address, wherein the first memory page comprises control parameters for one or more queues including control parameters for a first queue associated with the first queue index;
   receiving a first view index from an index register, the first view index corresponding to the first queue index;
   determining whether the first view index from the index register corresponds to the first page address of the command; and
   responsive to the first view index from the index register corresponding to the first page address of the command, allowing access to a portion of the first memory page that includes the control parameters for the first queue.

2. The method of claim 1, further comprising:
   allocating the parameter memory page and populating portions of the parameter memory page with control parameters for the first queue and for one or more other queues.

3. The method of claim 2, wherein allocating the parameter memory page includes allocating a page in a memory-mapped input-output (MMIO) space for an accelerator device that uses a compute express link (CXL) interconnect to communicate with a host device.

4. The method of claim 1, further comprising:
   responsive to the first view index from the index register not corresponding to the first page address of the command, denying access to the portion of the first memory page that includes the control parameters for the first queue.

5. The method of claim 4, further comprising:
   requesting access to the first memory page based on instructions from a first application;
   wherein denying access to the portion of the first memory page further comprises returning an error message to the application.

6. The method of claim 1, wherein receiving the first view index includes using a command manager to retrieve the first view index from a control register.

7. The method of claim 1, further comprising populating the index register with the first view index in response to initiation of the first queue.

8. The method of claim 1, wherein receiving the first view index from the index register includes receiving a multiple-bit page identifier, and
   wherein determining whether the first view index corresponds to the first page address includes determining whether the first page address matches the multiple-bit page identifier.

9. The method of claim 1, wherein the first page address indicates the first memory page, and wherein the first view index includes a register offset that indicates a particular location in the first memory page.

10. The method of claim 1, further comprising populating the index register with the first view index and associating the first view index with the first queue index.

11. The method of claim 1, further comprising:
    requesting access to the portion of the first memory page using a second command that includes the first queue index and a second page address;

retrieving the first view index from a control register using the first queue index; and conditionally granting or inhibiting access to the portion of the first memory page based on a determined correspondence between the first view index and the second page address.

12. The method of claim 1, further comprising:

requesting access to a second portion of the first memory page using a third request that includes a second queue index and the first page address;

retrieving a second view index from the index register using the second queue index;

determining whether the second view index from the index register corresponds to the first page address of the third request;

responsive to determining the second view index from the index register corresponds to the first page address, allowing access to the second portion of the first memory page; and responsive to determining the second view index from the index register does not correspond to the first page address, inhibiting access to the second portion of the first memory page.

13. A system comprising:

a host device configured to execute an application comprising one or more application processes using one or more queues; and an accelerator device communicatively coupled with the host device, the accelerator device comprising a memory device configured to store control parameters for the one or more queues, wherein the accelerator device is configured to:

responsive to a first application process of the application, populate a first portion of a first memory page in the memory device, the first memory page comprising control parameters for each of multiple queues belonging to the application including control parameters for a first queue, the first queue corresponding to a first queue index;

receive an access request to the first memory page using a request command that includes the first queue index and a first page address;

retrieve a first view index from an index register using the first queue index;

determine whether the first view index from the index register corresponds to the first page address of the request command; and responsive to the first view index from the index register corresponding to the first page address of the request command, allow access to a portion of the first memory page that includes the control parameters for the first queue.

14. The system of claim 13, wherein the accelerator device is further configured to deny access to the portion of the first memory page when the first view index does not correspond to the first page address of the request command.

15. The system of claim 14, wherein the accelerator device is configured to send an error message to the host device when the accelerator device denies access to the first memory page.

16. The system of claim 13, wherein the accelerator device comprises a logical comparator circuit configured to determine whether bits in the first view index from the index register match corresponding bits in the first page address of the request command.

17. The system of claim 13, wherein the accelerator device is coupled to the host device using a compute express link (CXL) interconnect.

18. The system of claim 17, wherein the first memory page in the memory device comprises a memory-mapped input-output (MMIO) space of the accelerator device.

19. The system of claim 18, wherein the host device is configured to access the MMIO space of the accelerator device using the access request.

20. The system of claim 13, wherein the index register comprises a kernel register.

21. A non-transitory computer-readable storage medium, the computer-readable storage medium including instructions that when executed by a computer, cause the computer to:

request access to a first memory page of an accelerator device using a command that includes a queue index and a page address;

use the queue index to retrieve a first view index from an index register in a kernel space of the accelerator device, the first view index corresponding to the queue index; and based on correspondence between the page address and the first view index, conditionally allow or deny access to a control register corresponding to the page address, wherein the control register comprises a portion of the first memory page.

22. The computer-readable storage medium of claim 21, wherein the instructions further configure the computer to:

determine whether the first view index from the index register corresponds to the first page address of the command; and responsive to the first view index from the index register matching the page address of the command, allow access to the control register, and responsive to the first view index from the index register not matching the page address of the command, deny access to the control register and provide an error message.

23. The computer-readable storage medium of claim 21, wherein the instructions further configure the computer to populate the index register with the first view index in response to initiation of the first queue, wherein the first queue corresponds to the queue index.

24. The computer-readable storage medium of claim 21, wherein the instructions further configure the computer to allocate the portion of the first memory page in a memory-mapped input-output (MMIO) space of an accelerator device, wherein the portion of the first memory page comprises the control register.

25. The computer-readable storage medium of claim 21, wherein the first view index includes a register offset that identifies a particular location in the first memory page.

26. The computer-readable storage medium of claim 21, wherein the instructions further configure the computer to, responsive to initiation of a first application process, populate the index register with the first view index and associate the first view index with the queue index.

* * * * *